Dec. 19, 1961  S. S. DAVIES  3,013,660
SIZING DEVICE
Filed June 22, 1959  3 Sheets-Sheet 1
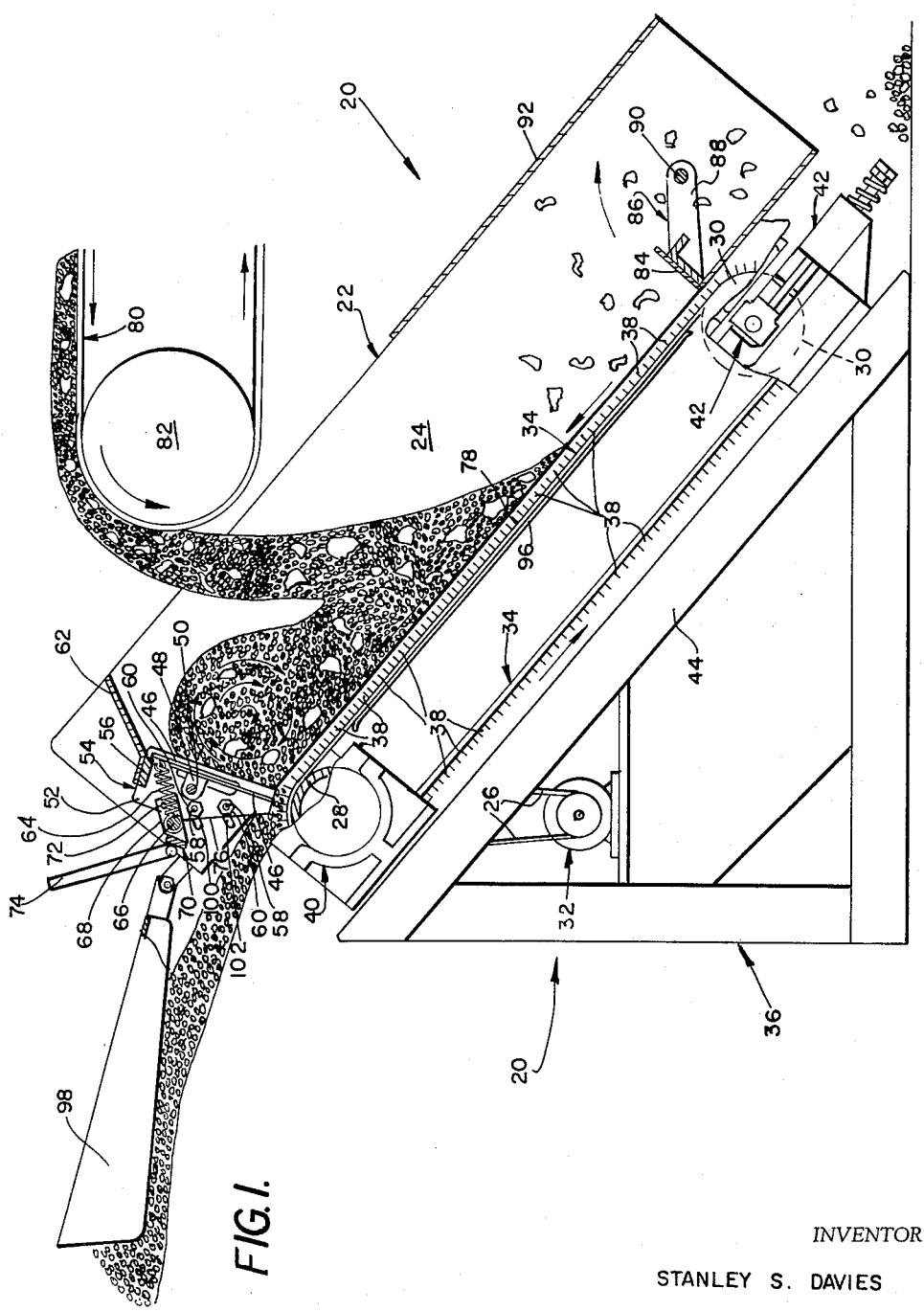
FIG. I.
INVENTOR
STANLEY S. DAVIES
BY Cushman, Darby & Cushman
ATTORNEY Dec. 19, 1961   S. S. DAVIES   3,013,660
SIZING DEVICE
Filed June 22, 1959   3 Sheets-Sheet 2
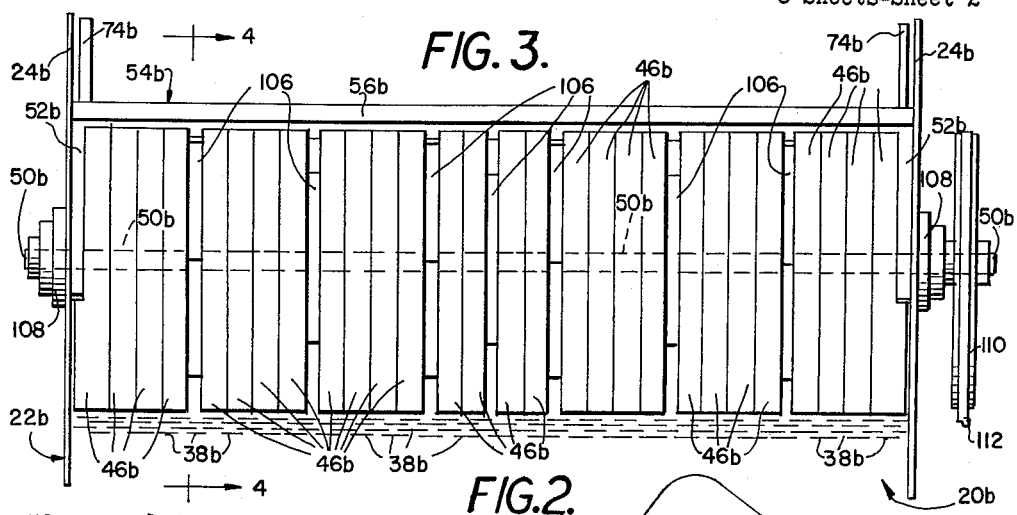
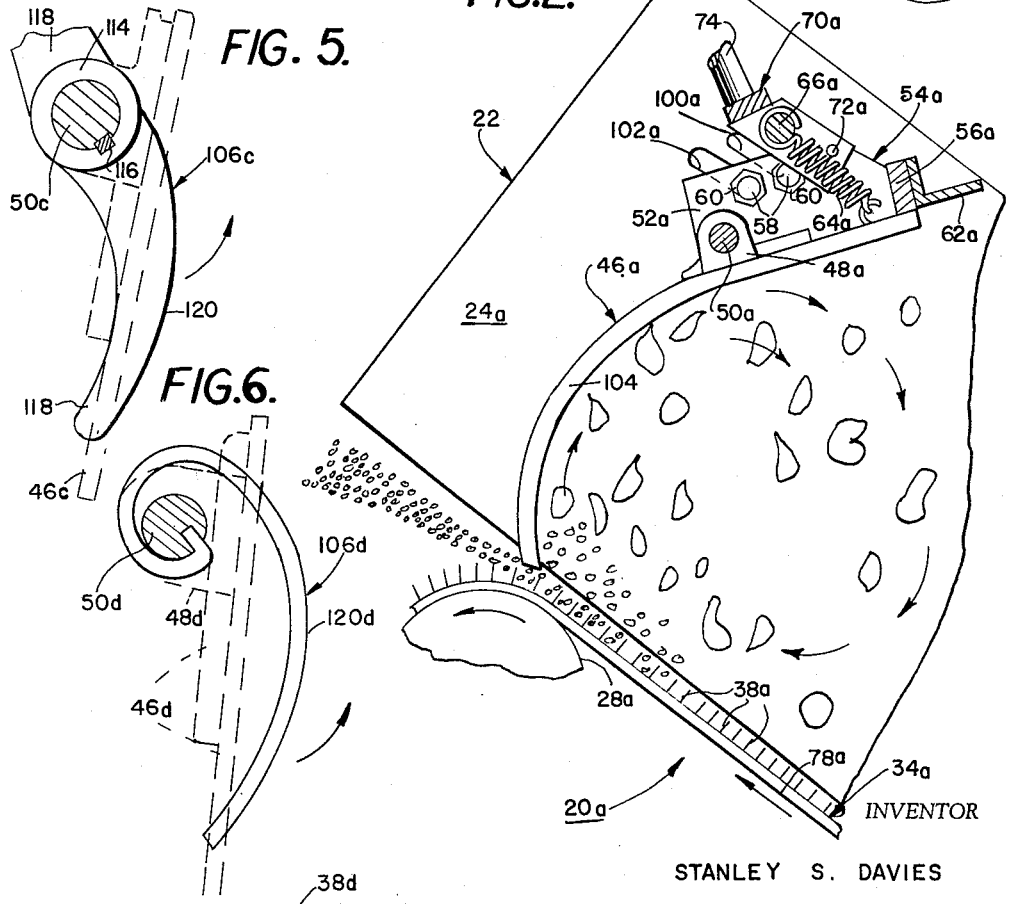
INVENTOR
STANLEY S. DAVIES
BY Cushman, Darby & Cushman
ATTORNEYS Dec. 19, 1961    S. S. DAVIES    3,013,660
SIZING DEVICE
Filed June 22, 1959    3 Sheets-Sheet 3
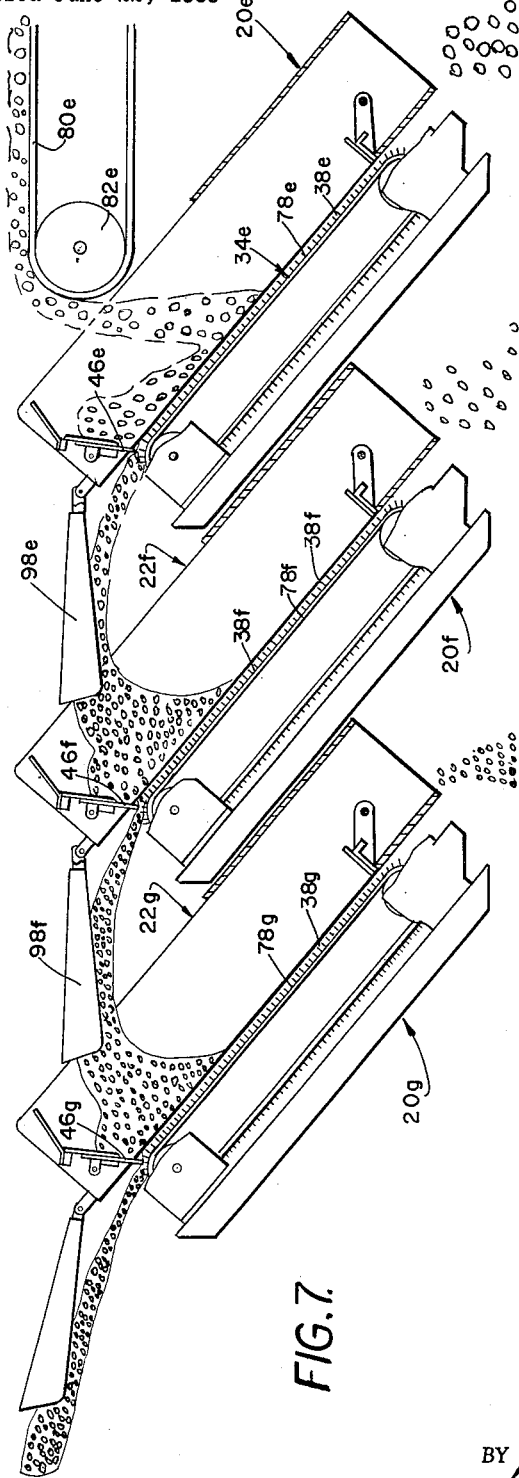
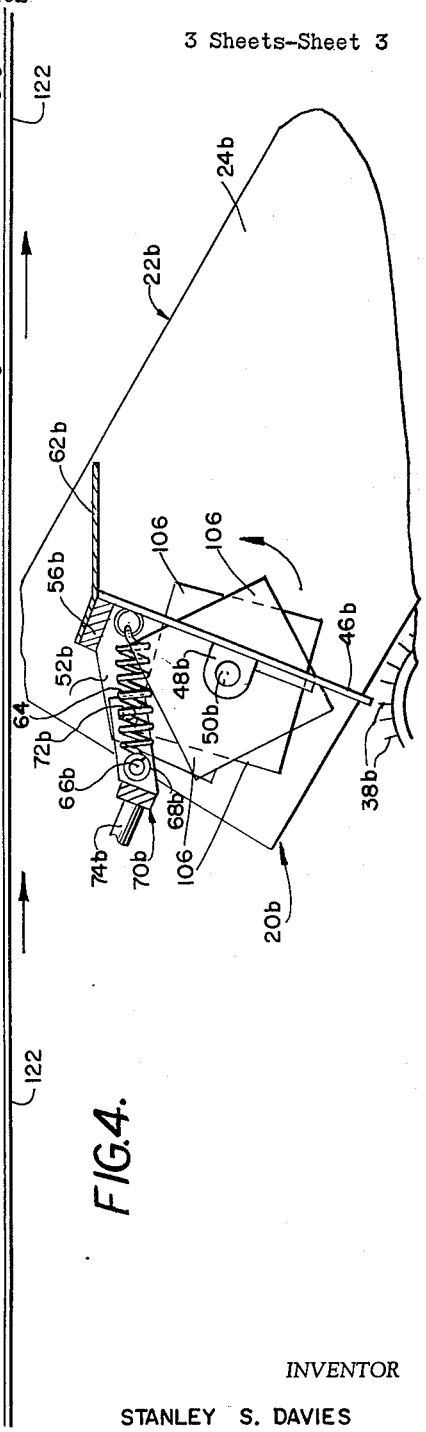
INVENTOR
STANLEY S. DAVIES
BY Cushman, Darby & Cushman
ATTORNEYS United States Patent Office 3,013,660
Patented Dec. 19, 1961

3,013,660
SIZING DEVICE
Stanley S. Davies, Kingston, Pa., assignor to Royer Foundry & Machine Company, Kingston, Pa., a corporation of Pennsylvania
Filed June 22, 1959, Ser. No. 821,735
10 Claims. (Cl. 209—92)

This invention relates to the sizing, separating or grading of granular materials, and more specifically, it relates to machines and procedures for performing these functions.

An important object of the invention is to provide a novel machine for efficiently sizing or grading granular materials, particularly heavily bonded stiff or sticky materials, such as iron ore, clay or the like.

A further object resides in the provision of new and useful improvements in machines such as those disclosed in United States Patents Nos. 1,559,915, 1,736,055 and 2,168,515. Such improvements are designed to make these machines especially adapted to be used for sizing or grading heavily bonded stiff or sticky materials, including iron ores or the like having relatively high moisture contents.

As is understood, the type of machine disclosed in the patents referred to generally includes an inclined conveyor in the form of an endless belt having a lower run and also having an upwardly moving upper run provided with sprigs defining pockets therein of substantially uniform depth for receiving the granular materials. A plurality of sweep blades is arranged adjacent to and above the top of the upper conveyor run for retaining some of the material while permitting some of the material to pass therebelow and be thrown out of the conveyor pockets or discharged by centrifugal force, thus effecting discharge of material of desired characteristics.

By the present invention, novel means are provided in machines of this character to effect a beneficial churning or mixing action of the granular material or ore adjacent the blades in order to promote a highly efficient and satisfactory sizing of all of the material carried up to the blades by the upper conveyor run. Furthermore, it is preferred that a material feeding arrangement be provided for initially distributing the ore or the like on the upper half of the upper conveyor run.

In accordance with one aspect of the invention, therefore, there is provided a machine of the character described for sizing ore or the like comprising a housing, an inclined endless conveyor having an upper and a lower run arranged in said housing and also having pockets therein of substantially uniform depth, means for moving the upper run of the conveyor in an upward direction, means for feeding granular ore or the like onto the upper run of the conveyor, a plurality of blades movably arranged in the housing adjacent the upper end of the upper conveyor run, these blades normally being in generally coplanar relation extending transversely of the conveyor and terminating in a lower edge spaced a predetermined uniform distance above the pockets on the upper run of the conveyor, biasing means for continuously and yieldably urging the lower edge of the blades in a direction opposite to the movement of the upper conveyor run, and means providing for churning or agitating the granular ore or the like adjacent said blades and not in said pockets.

In one embodiment of the invention, to be described more fully hereinafter, the desired churning or agitating action referred to is effected by reason of a particular angular disposition of the blades relative to the upper run of the conveyor. In another embodiment, the lower portion of the blades is concavely curved. And in still another embodiment, the churning means is defined by a plurality of agitating elements arranged for rotation at spaced intervals between and adjacent to the blades.

It is a still further objective to provide a novel system for separating or sizing ore or other similar granular material. Such a system includes a plurality of machines of the type referred to placed in series, with the material discharged from one machine being directed on to the upper conveyor run of the next downstream machine, and with the machines being so constructed, arranged and designed that the material discharged from each successive machine is of progressively finer or smaller character.

Further objects of the invention will be in part obvious and in part pointed out hereinafter.

The invention, and novel features thereof, may best be made clear from the following description and the accompanying drawings in which:

FIGURE 1 is an elevational view, partly in vertical section, of a sizing machine embodying the invention;

FIGURE 2 is an enlarged and fragmentary elevational and partly vertically sectioned view of a modification of the sweep blade structure of FIGURE 1;

FIGURE 3 is an enlarged and fragmentary end elevational view of a further modification of the sweep blade construction;

FIGURE 4 is a sectional view taken generally along line 4—4 of FIGURE 3;

FIGURES 5 and 6 are enlarged and fragmentary views of modifications of the agitating elements shown in FIGURES 3 and 4; and FIGURE 7 is an elevational view, partly in vertical section, of a sizing system according to the invention.

Referring now to the drawings, and in particular to the embodiment of the invention shown in FIGURE 1, it will be seen that the sizing machine, indicated generally by numeral 20, like those disclosed in Patents Nos. 1,736,055 and 2,168,515 includes a suitable hopper 22 having parallel and opposed side walls 24, this hopper being open at the bottom and positioned above a flexible sizing or separating belt 34 mounted upon suitable supporting rollers 28, 30 to travel in a vertically inclined direction. The upper supporting roller 28 may be appropriately connected to a motor 32 or similar prime mover, as by belt gearing 26, for example, in the manner disclosed in the patents referred to.

The belt supporting rollers 28, 30 and the motor 32 are shown as being mounted in a supporting frame 36 adapted to be arranged in a stable upright position on a level surface, as indicated. If desired, this frame may be provided with wheels and a handle (not shown), as disclosed in the patents referred to, for the purpose of facilitating movement of the machine 20, when desired.

The belt 34, which is driven at a relatively high speed by the motor 32, as is customary in this type of machine, is provided with a series of outwardly projecting sprigs 38 defining transverse pockets therebetween adapted to receive the granular material being handled by the machine. These sprigs operate to separate granular-like particles of predetermined size from a mass of material deposited upon the belt within or between the side walls 24 of the hopper 22, and the particles collected in the pockets or spaces defined between the sprigs on the belt will be discharged in a stream as they pass over the upper belt supporting roller 28, as is understood.

The speed at which the belt is driven preferably is such that the stream of particles thus separated and collected will be discharged at a considerable distance from the apparatus, passing through the air during such discharge, and such particles will thereafter be collected in any convenient or desirable manner.

The belt 34 may be constructed of any appropriate material, for example, it may be made of a strong woven fabric. The sprigs 38 may be constructed and arranged on the belt 34 in the manner taught by any of the three patents referred to above.

Thus, it will be appreciated that the machine 20 is of the same basic design as the machines disclosed in the prior patents referred to hereinabove. Accordingly, the disclosures of these patents are hereby incorporated herein by reference, and it is therefore not necessary to include herein a full and complete description and illustration of this type of machine.

Supports 40, 42 are shown in FIGURE 1 as being arranged on the frame 36 for the purpose of journalling or rotatably supporting the upper 28 and lower 30 rollers, respectively. These supports may be of the character disclosed in the aforesaid patents. The lower support 42 is shown as being of the type disclosed in Patent 2,182,284, and the disclosure of this latter patent therefore is hereby incorporated herein by reference. As shown and described in the patents referred to, suitable means will be provided for supporting the hopper 22 in position on the frame 36 and above the belt 34. Such means may include a supporting member (not shown) arranged along each side of the machine and engaged to the adjacent side wall 24 of the hopper and also to the inclined part 44 of the frame 36.

Disposed adjacent to and above the top roller 28 is a plurality of movably mounted sweep blades 46, extending transversely between the side walls 24 of the hopper, as disclosed in Patents 1,736,055 and 2,168,515. Each of these sweep blades includes a support 48 arranged at the rear thereof and journalled on a transverse shaft 50 extending between the opposed and parallel side walls 52 of the sweepblade supporting member 54. A top wall 56 is engaged to and extends between these side walls 52, and such side walls are adapted to be connected to the adjacent side walls 24 of the hopper 22, as by bolts 58 and nuts 60, the bolts 58 extending through suitable holes in the side walls of the hopper 22 and support member 54, as will be understood.

A baffle 62 is shown as being connected to the top wall 56 of the support member 54, extending generally upwardly therefrom for a purpose that will become apparent as the description proceeds.

A tension spring 64 is provided for each of the sweep blades 46, as understood. One end of each spring is connected to a sweep blade, while the other end is engaged to a transverse bar 66 carried between the parallel legs 68 of a bracket 70 of generally U-shaped configuration in plan view. These legs 68 are pivotally engaged to the side walls 52 of the support member 54, as at pivot points 72, to provide a transverse, horizontal pivotal axis about which the bracket 70 may be swung, such axis being parallel to the axis of the transverse bar 66 and shaft 50. Thus the bracket 70 may be pivoted in either a clockwise or counterclockwise direction about the axis of the pivot pins 72. A handle 74 may be engaged to this bracket 70 adjacent each leg 68.

The transverse bar 66 may extend laterally outwardly from one or both of the legs 68 of the bracket 70 a sufficient distance so as to strike the rear edge 76 of the side walls 52 of the support member 54 at the lower limit position thereof shown. Other stop means may be used for this purpose as will be evident. In the position thereof shown in FIGURE 1, the longitudinal axis of the transverse bar 66 is disposed at a point below the line connecting the pivot pin 72 to the point of connection of the springs 64 to the blades 46, whereby an off-center action will result wherein the tension springs 46 operate to effectively retain the U-shaped bracket 70 in the position thereof shown in the drawing.

At the same time, when it is desired to pivot all of the sweep blades 46 in a clockwise direction about shaft 50, the handles 74 will be pushed or pulled upwardly so as to move the transverse bar 66 above the pivot pins 72. In this way, the spring bias on the blades 46 will be relieved, and the blades will be moved or can be readily moved in a clockwise direction to increase the clearance between their lower edges and the conveyor 34 so that any large particles stuck therebetween may be quickly removed, as discussed in Patent No. 2,168,515.

As will be apparent, in the normal position of the sweep blades shown in FIGURE 1, these blades 46 will be disposed in generally co-planar relationship, with the top wall 56 of the support member 54 acting as a stop or abutment limiting the counterclockwise movement of these blades, as viewed in FIGURE 1, under the action of their springs 64.

As previously indicated, the construction of the sweep blades 46, and their connection to the transverse shaft 50, may be in accordance with the teachings of Patents Nos. 1,736,055 and 2,168,515. In the latter patent, means are disclosed for permitting convenient adjustment of the clearance between the lower edges of the blades and the sprigs on the conveyor, and such means may be utilized with the blades 46. As is understood, the clearance referred to and the depth of the pockets defined by sprigs 38 will determine the size of the particles discharged by the machine 20, and the spring mounting for each of the blades 46 will provide for yieldability of any such blades in the event large masses or objects tend to get stuck between the blades and sprigs of the conveyor. At the same time, these blades 46 will normally act to prevent the passage of undesirable material therebeneath.

Means are provided for delivering the material to be sized onto the upwardly moving upper conveyor run 78. As shown in FIGURE 1, this means may be in the form of a conveyor 80 extending around a roller 82 and moving in the direction of the arrows. Preferably, the conveyor 80 and roller 82 are so arranged as to deliver the material to be sized onto the upper half of the upper conveyor run 78.

A retaining wall 84 is shown as being provided at the bottom of the hopper 22. This wall may be of the general type disclosed in the patents referred to, and may be mounted for swinging movement to an inactive position, as by being connected to a bracket 86 of generally U-shaped configuration in plan view, the legs 88 of which bracket are pivoted to the side walls 24 of the hopper 22 as by a transverse shaft 90 extending therebetween. A handle (not shown) may be provided on the shaft 90 for rotating or swinging the retaining wall in the direction of the arrow and between the position thereof shown in FIGURE 1 and its inactive position.

A top wall 92 for the hopper is shown as extending between the side walls 24, from the lower end of the hopper to a point somewhat short of the longitudinal midpoint of the hopper.

A plate 96 is shown as being arranged underneath the upper run 78 of the conveyor to prevent sagging between the supporting rollers 28, 30. This plate, for example, may be constructed and arranged in the machine in the manner taught in Patent No. 1,736,055.

An adjustable deflector 98 of the character referred to in Patent No. 2,168,515 is shown as being provided at the upper end of the hopper 22.

In the operation of the machine 20 for the sizing of heavily bonded stiff and sticky materials, such as iron ore, the unsized iron ore will be fed onto the upper half of the upper run of the conveyor 34 by the conveyor 80 or other appropriate feeding means, such as a hopper (not shown). The forward and upward motion of the belt upper run 78 carries the load forward until it reaches the spring biased retarding sweep blades 46. In accordance with the invention, means are provided for promoting churning or agitation of the material in the region of these blades so that the sprigs on the rapidly moving conveyor belt 34 may advantageously operate to comb the fines or small particles from the bottom of the churning load and discharge them beneath the adjustable blades 46 of the spring loaded retarding sweep.

In the embodiment of FIGURE 1, the means for promoting the churning or agitating action referred to is defined by the angular disposition of the plane of the sweep blades 46, in their normal position, relative to the plane of the upper run 78 of the conveyor moving therebeneath. In this connection, means are provided according to one aspect of the invention whereby the angular disposition of the plane of the sweep blades 46 relative to the plane of the upper run of the conveyor belt may be varied or adjusted. In the embodiment shown in FIGURE 1, this latter means comprises structure allowing the support member 54 for the sweep blades to be mounted in any of a number of adjusted positions. For example, upper 100 and lower 102 arcuate slots may be formed in corresponding positions in each of the side walls 24 of the hopper 22 for reception of the bolts 58. As will be appreciated, these slots 100, 102 may be formed in the side walls 52 of member 54, rather than in the hopper side walls. Thus, by loosening the nuts 60, the support member 54 may be moved to a desired angular position relative to the plane of the upper run of the conveyor, the nuts 60 being thereafter tightened to retain the support member and the sweep blades 46 in this position.

It was found that in the case where unsized ore fed from the conveyor 34 had a moisture content in excess of 14 points, a highly satisfactory churning action took place behind the sweep blades 46 when the plane of the sweep blades intersected the plane of the upper run 78 of the conveyor belt therebeneath at an angle of approximately 115°, thus giving excellent results.

Exemplary clearances between the lower edge of the sweep blades 46 and the sprigs 38 of the belt 34 at the bottom of the blades are one-half inch and one inch.

Referring again to the operation of the machine of FIGURE 1, as the operation proceeds, the large pieces of ore are not discharged with the fines, but instead are rolled and churned with the load, gradually becoming cleaned of ore or fines, due to the beneficial churning or agitating action referred to, and then they gravitate or bounce toward the lower part of the machine, where they are discharged automatically over the low retaining plate 84, as indicated.

It will be observed that by controlling the feed or delivery rate of the material onto the upper run of the conveyor 34 by the feeding conveyor 80, so as to avoid overloading the machine, there will be little or no danger of any of the fines reaching the lower end of the machine where they might otherwise flow over the retaining wall 84. In this connection, the upper run 78 of the conveyor may be made longer, if desired, and in that case, the retaining wall 84 may become unnecessary and removed.

It should be appreciated that structure other than the arcuate slots 100, 102 may be used to provide for adjustment of the angular position of the sweep blades. For example, a plurality of positioning holes may be formed in the hopper side walls 24, in lieu of the slots 100, 102, for this purpose.

Another embodiment of the sweep blades and the supporting member therefor, according to the invention, is shown in FIGURE 2, wherein parts similar to those previously described are designated by similar reference characters.

The sweep blades 46a of FIGURE 2 are shown as including a concavely curved lower portion 104. The side walls 52a of the support member 54a may be adjustably mounted in any of a number of positions as in the manner described above in connection with FIGURE 1, whereby the angular disposition of the lower portion of the blades 46a relative to the upper run of the conveyor 34a may be adjusted. It was found that the concavely curved lower portion 104 of the sweep blades 46a enhances the rolling and churning action of the material, referred to above, giving somewhat more advantageous results than those achieved with the straight blades shown in FIGURE 1.

At this point, it should be reiterated that the action of the machines embodying this invention is such that it produces a churning or rolling of the material behind the retarding sweep blades during operation. This churning is believed to be necessary, and unless it is achieved and maintained, the machine will become blocked with material. Lightly bonded materials, such as lightly bonded foundry sands, will churn easily and very rapidly. Heavily bonded stiff, or sticky materials, such as clays, and iron ore, with moisture contents above twelve points, or higher are very difficult to churn. Therefore, one of the most serious problems in handling iron ore or the like is to develop a method and structure for promoting or positively assuring this churning action. As indicated, it was determined by experiment that arranging the shape and/or angle of the retarding sweep blades in the manner described, a beneficial churning action was established and maintained, and effective and satisfactory sizing of iron ore, clay and like stiff or sticky materials with relatively high moisture contents was realized.

FIGURES 3 and 4 illustrate a further modification of structure, according to the invention, at the top of the hopper. Inasmuch as this embodiment is similar to the embodiment of FIGURE 1, similar reference characters have been used to designate the same or similar parts. However, in this embodiment, there is provided a plurality of agitating elements 106, arranged at predetermined locations between adjacent sweep blades 46b, for example, as indicated in FIGURE 3 wherein an agitating element 106 is arranged between every fourth and fifth sweep blade 46b counting from either end, with an additional element 106 being arranged at the transverse midpoint of the sweep defined by the blades. These agitating elements, for example, may be made of metal. They are shown as being flat or planar, and of generally square shape. And, as best seen in FIGURE 4, they are fixedly and drivingly attached to the transverse shaft 50b by appropriate means, this being the same shaft that rotatably mounts the blades 46b. Also as best seen in FIGURE 4, these square plates 106 are arranged so that each successive plate is positioned approximately 45° out of phase with the next preceding plate.

The shaft 50b is shown in FIGURE 3 as extending through the side walls 52b of the U-shaped support bracket 54b, and also through the side walls 24b of the hopper 22b. Suitable bearings 108 are provided externally of the hopper side walls 24b for mounting the shaft 50b for rotation relative to the side walls 52b and 24b of the bracket 54b and hopper 22b respectively. Suitable means are provided for rotating the shaft 50b to rotate the plates 106 in a counterclockwise direction as viewed in FIGURE 4. Such means may be in the form of a pulley 110 fixed to the right hand end of the shaft 50b, as viewed in FIGURE 3, and drivingly connected to a power source, such as the output shaft of the motor 32, as by the belt 112, trained around pulley 110 and also around a pulley (not shown) on the motor output shaft.

The side walls 52b of the U-shaped bracket 54b may be secured to the side walls 24b of the hopper 22b by any suitable structure.

The plates 106 preferably will be rotated slowly. They will assist in producing the churning action of the stiff heavy load of ore or the like, as referred to above, to improve the efficiency of the sizing operation.

FIGURES 5 and 6 illustrate modifications of the agitating elements 106 shown in FIGURES 3 and 4. In FIGURE 5, the agitating element 106c is shown having a hub 114 keyed as at 116 to the shaft 50c, with arms or tines 118 extending in opposite directions therefrom, and of curved configuration defining a convex leading edge 120. One of these elements may be substituted for each of the plates 106 shown in FIGURE 3, to be rotated in the same direction, as indicated. By way of example, the elements 106c may be metallic castings.

The agitating element 106d, shown in FIGURE 6, may be a piece of spring steel fixedly secured to the shaft 50d, as indicated, and bending or curving outwardly therefrom, in the direction indicated, also to present a convex leading edge 120d. These elements 106d may be arranged in the positions of the plates 106 in FIGURES 3 and 4.

The elements 106c, 106d, may, for example, be of approximately the same width as the plates 106, shown in FIGURES 3 and 4.

By reason of the resiliency of the element 106d, there would be little or no danger of any of the solid chunks of ore becoming trapped or stuck between the sprigs 38d on the conveyor belt 34d and the elements 106d, since the sprigs and the elements 106d will be moving in opposite directions.

FIGURE 7 illustrates somewhat schematically a sizing system according to the invention wherein a plurality of sizing machines are placed in series. These machines are constructed in accordance with any of the embodiments of the invention, as described hereinabove, and hence, similar reference characters have been used to designate similar structure. As shown, the three machines 20e, 20f and 20g in series define a three stage sizing operation. The machines will be mounted in the positions shown by any suitable structure, as will be understood. Material is fed or charged into the hopper and on to the upper conveyor run 78e of the first machine 20e by means of conveyor 80e. The conveyor belt 34e in this machine will be designed with a coarse setting of the springs 38e thereon, and there will be a relatively wide opening or clearance between the bottom or lower edge of the sweep finger blades 46e and these sprigs.

The deflector 98e of the first machine and the disposition of the second machine 20f are so designed that the material discharged from between the sweep blades and sprigs of the first machine 20e will be directed into the hopper 22f and onto the upper conveyor run 78f of the second machine, and preferably onto the upper half thereof, as illustrated. In the second machine, the sprigs 38f will be arranged at a finer or closer setting on belt 26f, and there will be a smaller opening or clearance between such sprigs and the sweep finger blades 46f, than in first machine 20e.

The deflector 98f of the second machine and the disposition of the third machine 20g are so designed that the material discharged from between the sweep blades and sprigs of the second machine 20f will be directed into the hopper 22g and onto the upper conveyor run 78g of the third machine, and preferably onto the upper half thereof, as illustrated. In the third machine, the sprigs 38g will be arranged at a finer or closer setting on belt 26g, and there will be a smaller opening or clearance between such sprigs and the sweep finger blades 46g, than in second machine 20f.

In an exemplary arrangement for sizing iron ore or the like, the first stage may be set to separate the ore at the 1½ inch level, plus 1½ inch are being discharged out the rear or bottom of the machine, and the minus 1½ inch ore being discharged at the top of the machine and into the receiving hopper of stage two; stage two would be designed for separating ore at the 1 inch level; and the third stage would be designed to separate the ore at the ½ inch level. As indicated, these figures are merely exemplary, and could be varied, as desired. Likewise, the number of stages may be varied, as desired or required for a particular job.

All of the plus separation discharged from the bottom of the hoppers in the several stages may be collected on a conveyor belt 122 or the like passing beneath the three stages, as indicated in the drawing; while the fine material discharged from the top of the third and final stage will be collected in any suitable manner.

The overall capacity of the installation shown in FIGURE 7 will be determined by the ability of the first stage to handle the complete range of ore that is charged or fed into its hopper. The capacity of any single sizing machine is directly proportional to the size of the opening or clearance between the sweep finger blades and the sprigs on the cleated belt. It should be apparent, then, that if the first stage can be restricted to a large separation it will have a higher capacity than if it were restricted to the final small separation, as would be the case in a single stage operation.

In a multi-stage operation, such as that shown, the second stage will be receiving material that has already been shredded, that is, the fines will have been broken down into small globules as opposed to the big masses of wet, sticky ore that come out of the mine shaft initially. This will make the churning and separating operation much easier for the second stage, thereby allowing it to have better capacity for its finer setting than it would have if it were receiving the ore directly from the mine. The same applies to the third stage where the material charged thereinto will have been previously shredded to an even finer extent, and therefore, such material will churn and be separated more readily. In both stages two and three, the larger ores will have been previously eliminated, reducing the wear and tear on the finer belts in these stages. Also, as the ore proceeds from stage one to stage two to stage three, the total volume of ore to be handled by each succeeding stage is less than that in the previous stage and therefore, will better match the capacity of each unit or stage as the settings of successive stages become finer.

It thus will be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claims.

What is claimed is:

1. A device of the character described for sizing heavily bonded stiff or sticky materials such as clay, iron ore or the like comprising: a housing; an inclined endless conveyor having an upper and a lower run arranged in said housing and also having pockets therein of substantially uniform depth; means for moving the upper run of the conveyor in an upward direction; means for feeding heavily bonded stiff or sticky materials to be sized on to the upper run of the conveyor; a plurality of blades movably arranged in the housing adjacent the upper end of the upper run of the conveyor; these blades normally being in generally coplanar relation extending transversely of the conveyor and terminating in a lower edge spaced a predetermined uniform distance above the pockets on the upper run of the conveyor; biasing means for continuously and yieldable urging the lower edge of the blades in a direction opposite to the movement of the upper run of the conveyor; and means providing for churning or agitating the aforesaid material adjacent said blades, said last-named means comprising a plurality of agitating elements rotatably arranged at spaced intervals between said blades, and means for rotating said elements.

2. The structure defined in claim 1 wherein the feeding means is arranged to deposit the aforesaid material on the upper half of the upper run of said conveyor.

3. The structure defined in claim 1 including means providing for adjustment of the included angle between the plane of said blades and the plane of the upper run of said conveyor.

4. The structure defined in claim 1 wherein said blades have a lower portion concavely curved in the downward facing direction.

5. The structure defined in claim 1 wherein means are provided mounting said blades for independent pivotal movement about a common horizontal axis transverse to said conveyor, and further wherein said agitating elements are arranged for rotation about said common axis.

6. The structure defined in claim 5 wherein said agitating elements are of generally square shape.

7. The structure defined in claim 5 wherein said agitating elements are of elongated form extending outwardly from said axis and including a convex leading surface.

8. A device of the character described comprising: a housing; an inclined endless conveyor having an upper and a lower run arranged in said housing and also having pockets therein of substantially uniform depth; means for moving the upper run of the conveyor in an upward direction; a plurality of blades movably arranged in the housing adjacent the upper end of the upper run of the conveyor, these blades normally being in generally coplanar relation extending transversely of the conveyor and terminating in a lower edge spaced a predetermined, substantially uniform distance above the pockets on the upper run of the conveyor; means for continuously and yieldably urging the lower edge of the blades in a direction opposite to the movement of the upper arm of the conveyor; a plurality of agitating elements arranged for rotation about a common axis at spaced intervals between adjacent blades and including portions adapted to extend on either side of said blades; and means for rotating said elements in the same direction.

9. The structure defined in claim 8 wherein said agitating elements are in the form of generally square plates arranged in planes substantially perpendicular to the plane of said blades.

10. The structure defined in claim 8 wherein said agitating elements are of slender and elongated form extending outwardly from said axis and including convexly curved leading edges.

References Cited in the file of this patent

UNITED STATES PATENTS

| | | |
|---|---|---|
| 572,263 | Libbey | Dec. 1, 1896 |
| 1,894,008 | Segars | Jan. 10, 1933 |
| 2,168,515 | Davies | Aug. 8, 1939 |
| 2,183,233 | Zink | Dec. 12, 1939 |
| 2,770,400 | Mattson | Nov. 13, 1956 |